(12) United States Patent
Borgsten et al.

(10) Patent No.: US 7,887,909 B2
(45) Date of Patent: Feb. 15, 2011

(54) LIGHT TRANSMISSIVE FOAMED POLYMER SHEET AND METHODS FOR MAKING THE SAME

(75) Inventors: Jonas Erik Borgsten, Linkoping (SE); Rene de Nooijer, Middleburg (NL); Christianus Johannes Jacobus Maas, Rilland (NL); Eelco van Hamersveld, Raamsdnkveer (NL)

(73) Assignee: Sabic Innovative Plastics IP B.V. (NL)

( * ) Notice: Subject to any disclaimer, the term of this patent is extended or adjusted under 35 U.S.C. 154(b) by 570 days.

(21) Appl. No.: 11/828,496

(22) Filed: Jul. 26, 2007

(65) Prior Publication Data
US 2009/0029144 A1 Jan. 29, 2009

(51) Int. Cl.
B32B 27/06 (2006.01)

(52) U.S. Cl. .............. 428/319.3; 428/314.4; 428/314.8; 428/319.7; 428/319.9

(58) Field of Classification Search .............. 428/314.4, 428/314.8, 315.5, 315.7, 319.3, 319.7, 319.9
See application file for complete search history.

(56) References Cited

U.S. PATENT DOCUMENTS

| | | | |
|---|---|---|---|
| 3,177,109 A | | 4/1965 | Ziegler |
| 4,268,127 A | * | 5/1981 | Oshima et al. ................. 349/96 |
| 4,530,806 A | * | 7/1985 | Melchior .................... 264/416 |
| 4,587,272 A | | 5/1986 | Avakian et al. |
| 4,683,247 A | | 7/1987 | Allen et al. |
| 4,684,571 A | * | 8/1987 | Kunert et al. ............. 428/314.8 |
| 4,737,523 A | | 4/1988 | White et al. |
| 4,816,492 A | * | 3/1989 | Schiller et al. ................ 521/88 |
| 4,889,669 A | | 12/1989 | Suzuki |
| 5,147,481 A | * | 9/1992 | Deblander ................... 156/71 |
| 5,158,985 A | | 10/1992 | Kohler et al. |
| 5,158,986 A | | 10/1992 | Cha et al. |
| 5,215,691 A | | 6/1993 | Bland et al. |
| 5,256,702 A | | 10/1993 | Grigat et al. |
| 5,308,558 A | | 5/1994 | Woldenberg et al. |
| 5,314,925 A | | 5/1994 | Burnell et al. |
| 5,348,790 A | | 9/1994 | Ben-Zvi et al. |
| 5,411,683 A | | 5/1995 | Shah |
| 5,622,732 A | | 4/1997 | Beckwith |
| 5,854,294 A | | 12/1998 | Hirosawa et al. |
| 5,985,190 A | | 11/1999 | Harfmann |
| 6,256,937 B1 | | 7/2001 | Kogure et al. |
| 6,383,424 B1 | | 5/2002 | Huang et al. |
| 6,391,931 B1 | | 5/2002 | Gehlsen et al. |
| 6,403,663 B1 | | 6/2002 | DeSimone et al. |
| 6,440,241 B1 | | 8/2002 | Mason et al. |
| RE37,932 E | | 12/2002 | Baldwin |
| 6,492,015 B1 | | 12/2002 | Aoki et al. |
| 6,593,384 B2 | | 7/2003 | Anderson et al. |
| 6,623,674 B1 | | 9/2003 | Gehlsen et al. |
| 6,884,377 B1 | | 4/2005 | Burnham et al. |
| 6,946,090 B2 | | 9/2005 | Myer et al. |
| 6,958,365 B2 | | 10/2005 | Dontula et al. |
| 2003/0068485 A1 | * | 4/2003 | Ramsey ................... 428/318.4 |
| 2004/0002559 A1 | * | 1/2004 | Troutman et al. ........... 524/100 |

FOREIGN PATENT DOCUMENTS

| | | |
|---|---|---|
| EP | 0175965 | 4/1986 |
| EP | 0494445 B1 | 7/1992 |
| EP | 1906215 | 4/2008 |
| WO | 9604211 | 2/1996 |

OTHER PUBLICATIONS

Frederik W. B. Hoolhorst, U.S. Appl. No. 11/463,927, "Polymer Sheeting", filed Aug. 11, 2006.
Graff, "High-Performance Foams Fill Growing Market Niche"; www.Omnexus.com, Jun. 1, 2005, 8 pages.
European Patent No. 0175965; Publication Date: Apr. 2, 1986; Abstract Only; 1 Page.
International Search Report; International Application No. PCT/IB2008/052604; International Filing Date: Jun. 27, 2008; Date of Mailing: Apr. 8, 2009; 6 Pages.
Written Opinion of the International Searching Authority; International Application No. PCT/IB2008/052604; International Filing Date: Jun. 27, 2008; Date of Mailing: Apr. 8, 2009; 6 Pages.

* cited by examiner

Primary Examiner—Hai Vo
(74) Attorney, Agent, or Firm—Cantor Colburn LLP

(57) ABSTRACT

In some embodiments, a foamed polymer sheet comprises: a polymeric material and cells located in the polymeric material. The cells have a size distribution, $D_{90}$ of greater than or equal to 300 μm and the sheet has a light transmission of greater than or equal to about 5%. In another embodiment, the cells have an average diameter, as measured along a major axis, of about 1 mm to about 4 mm, and the sheet has a light transmission of greater than or equal to about 5%. In another embodiment, a method of making a foamed polymeric sheet comprises: combining a blowing agent with a polymeric material to form a mixture, nucleating bubbles in the mixture, and cooling the mixture. The mixture is at a sufficient temperature and the cells have a sufficient cell size such that the sheet has a light transmission of greater than or equal to 10%.

12 Claims, 2 Drawing Sheets

LIGHT TRANSMISSIVE FOAMED POLYMER SHEET AND METHODS FOR MAKING THE SAME

BACKGROUND

The present disclosure relates generally to foamed polymer sheet and methods for making the same, and particularly to a light transmissive foamed polymer sheet and methods for making the same.

In the construction of naturally lit structures (e.g., greenhouses, pool enclosures, conservatories, stadiums, sunrooms, and so forth), glass has been employed in many applications as transparent structural elements, such as, windows, facings, and roofs. However, polymer sheet is replacing glass in many applications due to several notable benefits.

One benefit of polymer sheet is that it exhibits excellent impact resistance compared to glass. This in turn reduces maintenance costs in applications wherein occasional breakage caused by vandalism, hail, contraction/expansion, and so forth, is encountered. Another benefit of polymer sheet is a significant reduction in weight compared to glass. This makes polymer sheet easier to install than glass and reduces the load-bearing requirements of the structure on which they are installed.

In addition to these benefits, one of the most significant advantages of polymer sheet is that it provides improved insulative properties compared to glass. This characteristic significantly affects the overall market acceptance of polymer sheet as consumers desire structural elements with improved efficiency to reduce heating and/or cooling costs, and preferably with reduced weight. Hence, there is a desire to employ foamed polymer sheet. However, such sheet is opaque and therefore unacceptable.

Therefore, what is needed in the art is light transmissive foamed polymer sheet.

BRIEF SUMMARY

Disclosed herein are light transmissive foamed polymer sheets and methods for making the same.

In some embodiments, a foamed polymer sheet comprises: a polymeric material and cells located in the polymeric material. The cells have a size distribution, $D_{90}$ of greater than or equal to 300 μm and the sheet has a light transmission of greater than or equal to about 5%.

In another embodiment, a foamed polymer sheet comprises: a polymeric material and cells located in the polymeric material. The cells have an average diameter, as measured along a major axis, of about 1 mm to about 4 mm, and the sheet has a light transmission of greater than or equal to about 5%.

In one embodiment a method of making a foamed polymeric sheet comprises: melting a polymeric material, combining a blowing agent with the polymeric material to form a mixture in an extruder, inhibiting foaming prior to exiting the extruder, nucleating bubbles in the mixture, and forming the mixture into a sheet. The mixture is at a sufficient temperature to enable the production of cells having a cell size, as measured along a major axis, of greater than or equal to 1 mm, and the sheet has a light transmission of greater than or equal to 5%.

In another embodiment, a method of making a foamed polymeric sheet comprises: combining a blowing agent with a polymeric material to form a mixture, nucleating bubbles in the mixture to form cells, and cooling the mixture between calibration plates to produce the foamed polymeric sheet. The mixture is at a sufficient temperature and the cells have a sufficient cell size such that the foamed polymeric sheet has a light transmission of greater than or equal to 10%.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Figure 1:
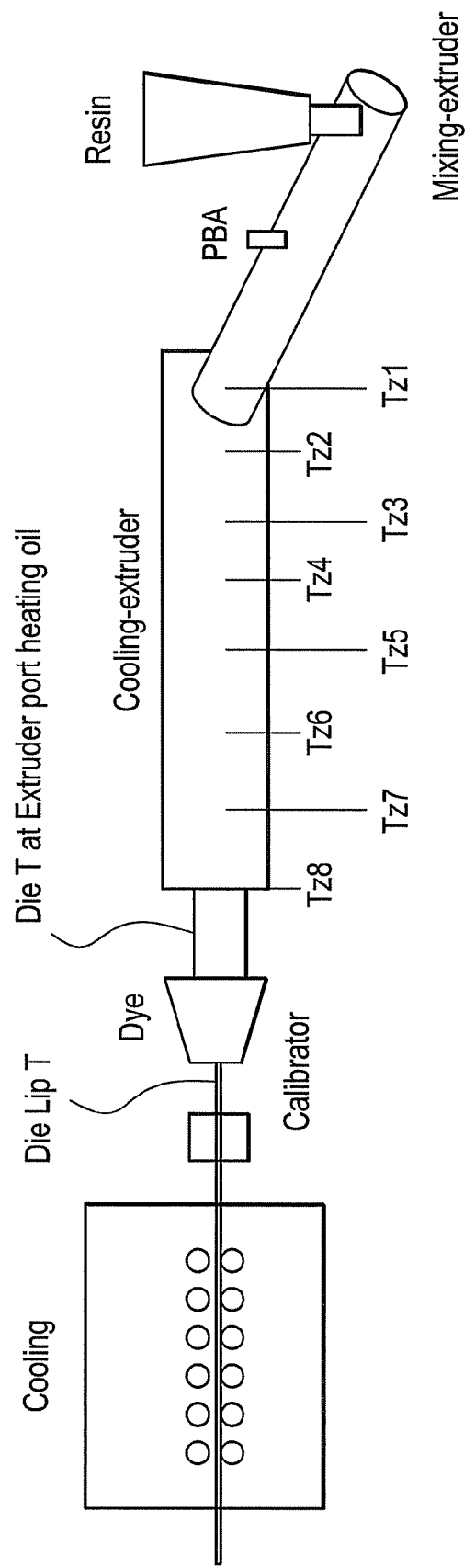
FIG. 1 is an exemplary schematic of a continuous process for producing a light transmissive foamed polymer sheet.

Disclosed herein are light transmissive foamed polymer sheet, light transmissive foamed polymer multiwalled sheet, and methods for making the same. The foamed sheet has a light transmission of greater than or equal to 1%, or, specifically, greater than or equal to about 5%, or, more specifically, greater than or equal to about 10%, or, even more specifically, greater than or equal to about 20%, or, yet more specifically, about 30% to about 60%, and even more specifically, about 35% to about 55%. Unless specifically set forth herein to the contrary, light transmission is determined as per ASTM D-1003-00 (Procedure B, Spectrophotometer, using illuminant C with diffuse illumination and with unidirectional viewing), wherein light transmission is defined as:

$$\%T = \left(\frac{I}{I_O}\right) \times 100\% \qquad (I)$$

wherein:
I=intensity of the light passing through the test sample
$I_o$=Intensity of incident light Not to be limited by theory, it has been discovered that one of the factors affecting light transmission in a foamed polymer is cell size. Many processes produce small cell sizes (e.g., less than or equal to 100 micrometers (μm)). At these cell sizes, the foamed polymer is opaque (0% light transmission), even if the polymer would have a high light transmission (e.g., greater than 80%) if it were not foamed. Hence, the present foamed polymer has a sufficient cell size and/or cell size distribution to attain the desired light transmission. The present foamed polymer can have closed cells with a cell size distribution, $D_{90}$ (i.e., diameter of greater than or equal to 90% of the cells as measured along a major axis), of greater than or equal to about 300 μm, or, specifically, about 300 μm to about 4 mm, or, more specifically, about 500 μm to about 4 mm, or, yet more specifically, about 1 mm to about 3.5 mm, and, even more specifically, about 1.5 mm to about 3 mm. An average cell size (as measured along a major axis) can be greater than or equal to about 1 mm, or, specifically, about 1 mm to about 4 mm, or, more specifically, about 1.5 mm to about 3.5 mm, and yet more specifically, about 1.5 mm to about 3 mm, wherein the standard deviation is 2 mm.

The foamed polymer can have a sufficient number of cells to attain the desired properties while having the desired transmission. In some embodiments, the number of cells can be less than or equal to about 500 cells (e.g., voids) per cubic centimeters ($c/cm^3$), or, specifically, about 1 $c/cm^3$ to about 500 c/cm³, or, more specifically, about 5 c/cm³ to about 250 c/cm³, and yet more specifically, about 10 c/cm³ to about 100 c/cm³.

These cell sizes can be attained by a combination of pressure before the dye, processing temperature, blowing agent (type and concentration), and/or the foaming process employed. The foamed polymer can be produced in any process that attains the desired cell size. For example, the foamed polymer can be produced in an extrusion process. The temperature employed in the process is a temperature sufficient to attain the desired cell size, e.g., to inhibit nucleation of cells (e.g., to inhibit foaming post addition of the foaming agent and while retaining the desired viscosity and allowing foaming once the material has exited the extruder (e.g., post die). The temperature is a sufficient temperature to attain a cell size that enables the production of a light transmissive foamed polymer sheet, e.g., having a light transmission of greater than or equal to about 5%. For polycarbonate, for example, the temperature can be about 180° C. to about 260° C., depending upon the type and amount of blowing agent, or, specifically, about 200° C. to about 260° C., or, more specifically, about 220° C. to about 255° C., and yet more specifically, about 230° C. to about 250° C.

The polymer sheet can be formed from a polymer composition comprising polymeric material(s) (such as thermoplastic(s), thermoset(s), as well as combinations comprising at least one of the foregoing) that have a sufficient initial light transmission such that once foamed, they have the desired light transmission. For example, the polymeric material can have a light transmission of greater than or equal to about 80%, or, specifically, greater than or equal to about 85%. In addition to transmittance, the polymeric material can be chosen to exhibit sufficient impact resistance such that the sheet is capable of resisting breakage (e.g., cracking, fracture, and the like) caused by impact (e.g., hail, birds, stones and so forth). Therefore, polymers exhibiting an impact strength greater than or equal to about 7.5 foot-pounds per square inch, ft-lb/in² (4.00 joules per square centimeter, J/cm²), or more specifically, greater than about 10.0 ft-lb/in² (5.34 J/cm²) or even more specifically, greater than or equal to about 12.5 ft-lb/in² (6.67 J/cm²) are desirable, as tested per ASTM D-256-93 (Izod Notched Impact Test). Further, desirably, the polymeric material has ample stiffness to allow for the production of a sheet that can be employed in applications wherein the sheet is generally supported and/or clamped on two or more sides of the sheet (e.g., clamped on all four sides), such as in greenhouse applications comprising tubular steel frame construction. Sufficient stiffness herein is defined as polymers comprising a Young's modulus (e.g., modulus of elasticity) that is greater than or equal to about 200,000 pounds per square inch, psi (14,061 kilograms per centimeter squared (kg/cm²)), or more specifically, greater than or equal to about 250,000 psi (17,577 kg/cm²), or even more specifically, greater than or equal to about 300,000 psi (21,092 kg/cm²).

Exemplary thermoplastics include polyalkylenes (e.g., polyethylene, polypropylene, polyalkylene terephthalates (such as polyethylene terephthalate (PET), polybutylene terephthalate, poly(ethylene terephthalate) glycol (PETG))), polycarbonates, acrylics, polyacetals, styrenes (e.g., impact-modified polystyrene, acrylonitrile-butadiene-styrene (ABS), styrene-acrylonitrile), poly(meth)acrylates (e.g., polybutyl acrylate, polymethyl methacrylate), polyetherimide, polyurethanes, polyphenylene sulfides, polyvinyl chlorides, polysulfones, polyetherketones, polyether etherketones, polyether ketone ketones, and so forth, as well as combinations comprising at least one of the foregoing. Exemplary thermoplastic blends comprise acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleic anhydride/acrylonitrile-butadiene-styrene, polyether etherketone/polyethersulfone, polyethylene/nylon, polyethylene/polyacetal, and the like. However, in the specific embodiment illustrated, it is envisioned a polycarbonate material is employed, such as those designated by the tradename Lexan®, which are commercially available from the General Electric Company, GE Plastics, Pittsfield, Mass.

Additives can be employed to modify the performance, properties, or processing of the polymeric material. Exemplary additives comprise antioxidants, such as, organophosphites, for example, tris(nonyl-phenyl)phosphite, tris(2,4-di-t-butylphenyl)phosphite, bis(2,4-di-t-butylphenyl) pentaerythritol diphosphite or distearyl pentaerythritol diphosphite, alkylated monophenols, polyphenols and alkylated reaction products of polyphenols with dienes, such as, for example, tetrakis[methylene(3,5-di-tert-butyl-4-hydroxyhydrocinnamate)]methane, 3,5-di-tert-butyl-4-hydroxyhydrocinnamate octadecyl, 2,4-di-tert-butylphenyl phosphite, butylated reaction products of para-cresol and dicyclopentadiene, alkylated hydroquinones, hydroxylated thiodiphenyl ethers, alkylidene-bisphenols, benzyl compounds, esters of beta-(3,5-di-tert-butyl-4-hydroxyphenyl)-propionic acid with monohydric or polyhydric alcohols, esters of beta-(5-tert-butyl-4-hydroxy-3-methylphenyl)-propionic acid with monohydric or polyhydric alcohols; esters of thioallyl or thioacyl compounds, such as, for example, distearylthiopropionate, dilaurylthiopropionate, ditridecylthiodipropionate, amides of beta-(3,5-di-tert-butyl-4-hydroxyphenyl)-propionic acid; fillers and reinforcing agents, such as, for example, silicates, fibers, glass fibers (including continuous and chopped fibers), mica and other additives; such as, for example, mold release agents, UV absorbers, stabilizers such as light stabilizers and others, lubricants, plasticizers, pigments, dyes, colorants, anti-static agents, flame retardants, impact modifiers, among others.

In order to attain the desired foamed sheet, the polymeric composition also comprises blowing agent(s). The blowing agent(s) can be of the decomposition type (evolves a gas (e.g., carbon dioxide ($CO_2$), nitrogen ($N_2$), and/or ammonia gas) upon chemical decomposition), and/or an evaporation type (which vaporizes without chemical reaction). Possible blowing agents include, sodium bicarbonate, azide compounds, ammonium carbonate, ammonium nitrite, light metals which evolve hydrogen upon reaction with water, chlorinated hydrocarbons, chlorofluorocarbons, azodicarbonamide, N,N'dinitrosopentamethylenetetramine, trichloromonofluoromethane, trichlorotrifluoroethane, methylene chloride, organic carboxylic acids (such as formic acid, acetic acid, oxalic acid, ricinoleic acid, and so forth), pentane, butane, ethanol, acetone, $CO_2$, $N_2$, ammonia gas, and so forth, as well as combinations comprising at least one of the foregoing.

The amount of blowing agent employed is dependent upon the process, processing conditions, and the specific polymeric material(s). In some embodiments, the amount of blowing agent can be about 0.5 weight percent (wt %) to about 10 wt %, or, specifically, about 0.5 wt % to about 5 wt %, or, more specifically, about 1 wt % to about 4 wt %, wherein the weight percent is based upon a total weight of the polymer composition (e.g., polymeric material(s), additive(s), blowing agent(s), nucleating agent(s), etc.) In some embodiments, the blowing agent can be about 0.5 wt % to about 4 wt % $CO_2$, or, specifically, about 1 wt % to about 3 wt % $CO_2$, and about 0.25 wt % to about 2 wt % of an additional blowing agent(s) (other than $CO_2$), or, specifically, about 0.5 wt % to about 1.5 wt % of the additional blowing agent(s).

Additives or cell control agents influence the nucleation of foam cells by altering surface tension of the polymer composition or by serving as nucleation sites from which cells can grow. Nucleation agent(s) can be added to the polymer composition to promoting bubble formation during processing. Nucleation agents can be selected to develop cells of a particular pore size. Some possible nucleating agents include talc (magnesium silicate), glass-fibers, fumed silica, titanium dioxide, a mixture of citric acid and sodium bicarbonate, zinc oxide, and so forth, as well as combinations comprising at least one of the foregoing. The amount of the nucleation agent(s) employed is dependent upon the process, processing conditions, the specific polymeric material(s), the blowing agent(s), and the desired cell size. In some embodiments, the amount of nucleating agent(s) can be less than or equal to about 7 wt %, or, specifically, about 0.01 wt % to about 5 wt %, or, more specifically, about 0.5 wt % to about 1 wt %, wherein the weight percent is based upon a total weight of the polymer composition.

Various techniques can be employed to form the light transmissive foamed polymer sheet, including a continuous process or a batch process. The batch process is primarily used for making foams with very specific properties or in smaller volumes per batch. The continuous process, however, allows high-output conducive to production scale operations. In one embodiment, the continuous process uses an extruder, e.g., a single screw-extruder or a tandem set-up. Either approach can use co-rotating twin-screws. The process comprises: introduction of polymeric material and any additive(s) to the throat of the extruder, melting of the polymeric material, dissolution of blowing agent(s) in the melted polymeric material, plasticization of the polymeric material, nucleation of bubbles (e.g., due to pressure drop at die), bubble growth after die, cell structure stabilization (e.g., in cooling and calibration plates step). Desirably, cells nucleate in a limited number and grow simultaneously in the same speed in all directions to produce a light transmitting foam with homogenous three-dimensional mechanical properties.

The foamed polymer sheet can be co-extruded with other layer(s). For example, the sheet can be co-extruded with a cap-layer that can be located adjacent any side of the foamed sheet (e.g., top, bottom, and/or the side(s)). This cap-layer, which can have a thickness of less than or equal to about 200 µm, or, specifically, about 20 µm to about 200 µm, or, even more specifically, about 30 µm to about 100 µm, can comprise a plastic that does not reduce the light transmission of the article below a desired level. The non-foamed plastics include thermoplastic(s), thermoset(s), as well as combinations comprising at least one of the foregoing. Some exemplary plastics include those materials identified as polymeric materials above. Desirably, the plastic comprises UV absorber(s).

FIG. 1 illustrates an exemplary continuous process for producing the light transmissive foamed polymer sheet. As can be seen from the figure, the polymeric material (resin) is introduced to the throat of a mixing extruder. Downstream in the extruder, the blowing agent(s) are introduced to the melted resin. From the mixing extruder, the composition enters the cooling extruder. From the cooling extruder, the composition is extruded (optionally co-extruded with other layer(s)) through a dye where the pressure change induces nucleation of bubbles. From the dye, the sheet passes through a calibrator plates where the final physical shape of the foam sheet is attained, including the surface (e.g., skin formation). The resulting foamed polymer sheet can have a light transmission of greater than or equal to about 5%, a thickness of greater than or equal to about 0.1 mm (e.g., about 0.1 mm to about 40 mm, or, specifically, about 4 mm to about 25 mm). The density of the sheet can be less than or equal to about 600 kilograms per cubic meter ($kg/m^3$), or, specifically, about 60 $kg/m^3$ to about 600 $kg/m^3$, or, more specifically, about 70 $kg/m^3$ to about 400 $kg/m^3$, and yet more specifically, about 80 $kg/m^3$ to about 200 $kg/m^3$, as is determined in accordance with the extrusion machines (e.g., built by Berstorff, Hannover, Germany; DIN 53420/ISO 845:1998). The U value of greater than or equal to about 0.5 watts per square meter Kelvin (W/m2K).

To be specific, the U-value is the amount of thermal energy that passes across 1 square meter of the sheet 2 at a temperature difference between both sheet sides of 1° K. The U-value can be determined according to EN 675 and Deutches Institute fur Normung ("DIN") European Norm ("EN") 12667/12664. The U-value is calculated according to the following formula (II):

$$U = \frac{1}{1/\alpha_i + 1/\chi + 1/\alpha_a} \quad (II)$$

wherein:
$\chi=\lambda/s$
$\lambda$=thermal conductivity
s=sheet thickness
$(1/\alpha_i)$=thermal transition resistance value inside
$(1/\alpha_a)$=thermal transition resistance value outside The U-value was calculated by using the thermal transition resistance values called in the Norm NEN 1068 (Year 2001), wherein $(1/\alpha_i)$ is 0.13 square meters Kelvin per watt ($m^2K/W$) and $(1/\alpha_a)$ is 0.04 $m^2K/W$. The U value of the foamed sheet can be less than or equal to about 5 $W/m^2K$, or, specifically, less than or equal to about 3 $W/m^2K$, or, more specifically, less than or equal to about 2 $W/m^2K$.

Figure 2:
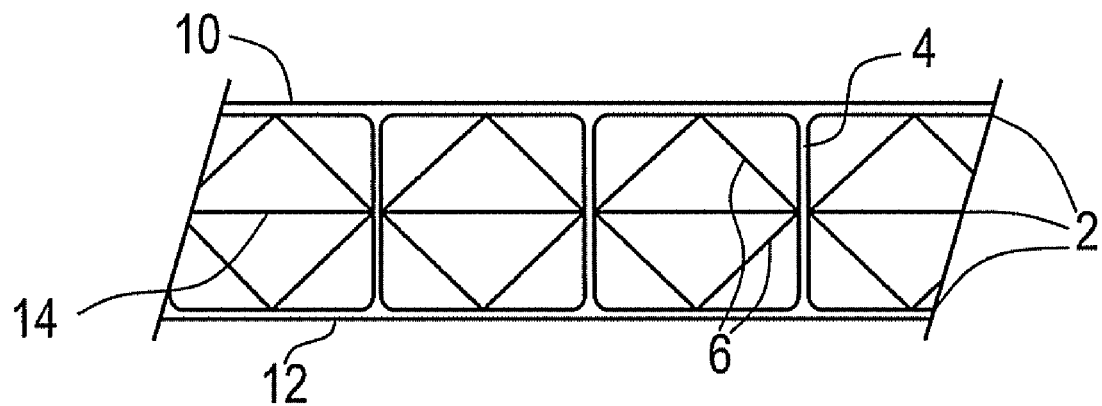
FIG. 2 is a partial front view of an exemplary multiwall sheet.
Figure 3:
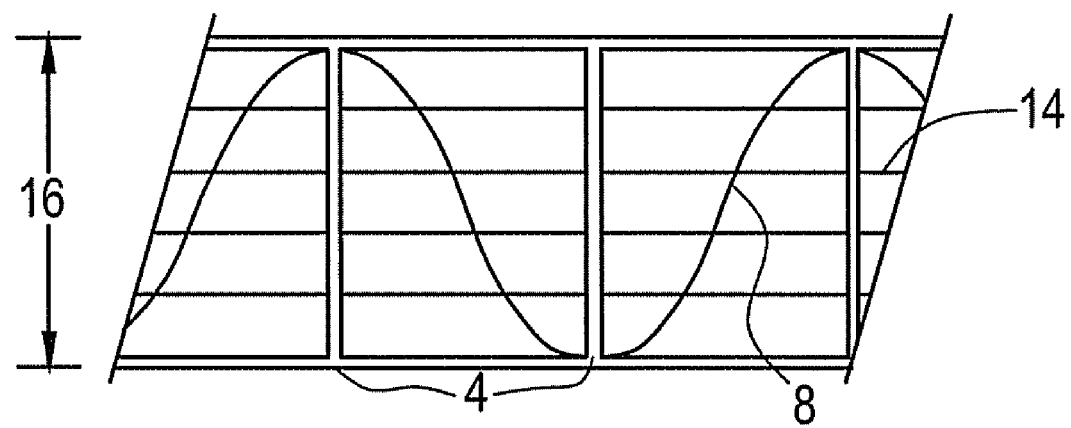
FIG. 3 is a partial front view of another exemplary multiwall sheet.

The foamed sheet can be a multiwalled sheet. Referring now to FIGS. 2 and 3, partial cross-sectional views of exemplary multiwall sheets are illustrated as having main layers 2 comprising a first outside layer (e.g., a top layer) 10 and a second outside layer (e.g., bottom layer) 12 that are connected by transverse layers (e.g., ribs) 4. The top layer 10 and the bottom layer 12, as well as inner layer(s) 14, are generally parallel with respect to each other. The transverse layer(s) 4 are generally disposed between, and normal to, the top layer 10 and the bottom layer 12.

Additionally, the sheet can have a sufficient number of transverse layers 4 to attain the desired structural integrity. In addition to the main layers and the transverse layers (ribs 4), dividers 6,8 can be employed. The dividers can have various geometries such as perpendicular (e.g., a cross (e.g., X) geometry (e.g., see FIG. 2, cross divider 6), a sinusoidal geometry (e.g., see FIG. 3, sinusoidal divider 8), as well as any other geometry and combinations comprising at least one of these geometries.

The number of layers of the multiwall sheet is dependent upon customer requirements such as structural integrity, overall thickness, light transmission properties, and insulative properties. The multiwall sheets have at least 2 layers, or specifically, greater than or equal to 3 layers (e.g., main layers), or, more specifically, about 3 layers to about 10 layers, and, yet more specifically, about 4 layers to about 8 layers. In some embodiments, the layers can each have a thickness of less than or equal to about 1 millimeter (mm), or, specifically, about 0.2 mm to about 0.8 mm, or, more specifically, about 0.3 mm to about 0.6 mm. Although the total thickness (arrow 16) of the sheet can be up to and even exceed about 10 centimeters (cm), generally, the thickness is less than or equal to about 32 millimeters (mm), or specifically, less than or equal to about 16 mm, and more specifically, less than or equal to about 12 mm. Generally, the total thickness of a multiwall sheet is greater than or equal to about 8 mm. In some embodiments, the transverse layers can each have a thickness of less than or equal to about 1 mm, or, more specifically, about 0.2 mm to about 0.8 mm, or, even more specifically, about 0.25 mm to about 0.6 mm.

Each cell 18 can comprise a width of about 10 mm, however any width can be employed that is capable of providing sufficient stiffness for the intended use (e.g., as a roofing or sheet product). To be more specific, when assembled, the sheet 2 can be exposed to a variety of forces caused by snow, rain, wind, and such. Therefore, if the sheet is to be employed as roofing, it is desirably capable of withstanding these forces without failing (e.g., buckling, cracking, bowing, and so forth). The specific dimensions of the final sheet 2 (e.g., total width, length and thickness), as well as the thicknesses of the top layer 4, bottom layer 6, and ribs 8, can be chosen such that the sheet 2 can withstand these forces.

Coextrusion methods and/or coating methods can also be employed during the production of the sheet 2 to supply differing polymers to any surface portion of the sheet's geometry, to improve and/or alter the performance of the sheet, and/or to reduce raw material costs. In one embodiment, a coextrusion process can be employed to add an aesthetic colorant to the top layer 10. The coating(s) can be disposed on any of the sheet's surfaces to improve the sheet's performance and/or properties. Exemplary coatings or coextrusion layers can comprise antifungal coatings, hydrophobic coatings, hydrophilic coatings, light dispersion coatings, anti-condensation coatings, scratch resistant coatings, ultraviolet absorbing coatings, light stabilizer coatings, and the like. It is to be apparent to those skilled in the art of coextrusion that a myriad of embodiments can be produced utilizing the coextrusion process.

EXAMPLES

Foaming of a polymeric material was evaluated with respect to both linear polycarbonate (namely Lexan® (102X) commercially available from GE Plastics, Pittsfield, Mass.), and branched polycarbonate (namely Lexan® (ML3324), also commercially available from GE Plastics). Sample 1 comprised 102X/ML3324, while the remaining samples comprised ML 3324.

Various foaming agents (also referred to herein as blowing agents) were used as is set forth in Table 1. In some cases, carbon dioxide $CO_2$ was used in addition to another foaming agent. $CO_2$ mixed with pentane, butane, and/or IPA admitted favorable foam structures, particularly when the extruder was not operated at maximum torque. Temperature profile is provided in Tables 1 and 2, wherein "Tz" is temperature zone, and "T" is temperature, "P" is pressure. The units are as follows: l/min is liters per minute; kW is kilowatt; amp is amperes; Kg/h is kilograms per hour; g/s is grams per second; % is percentage; and V is voltage.

TABLE 1

| | Sample No. | | | | | | |
|---|---|---|---|---|---|---|---|
| | 1 | 2 | 3 | 4 | 5 | 6 | 7 |
| Blowing Agent | Butane | $CO_2$ | Ethanol | Ethanol/$CO_2$ | Ethanol/$CO_2$ | Ethanol/$CO_2$ | Butane |
| Nucleation Agent | — | — | — | — | — | Talc Powder | Talc Powder |
| Revolutions [1/min] | 18 | 18 | 18 | 16 | 16 | 16 | 16 |
| Voltage [V] | | 76 | 76 | 68 | 68 | 69 | 69 |
| Current [amps] | | 76 | 97 | 70 | 90 | 75 | 74 |
| Power [kW] | | 6 | 7 | 5 | 7 | 6 | 4 |
| Polymer flow rate Kg/h | 40 | | 40 | 40 | | | 40 |
| Blowing Agent flow rate Kg/h | 12 | 1.6 | — | 1.0 | 1.0 | 1.0 | 1.0 |
| $CO_2$ flow rate [g/s] | — | — | 0.15 | — | 0.10 | 0.10 | 0.10 |
| Injection P [bar] | 90 | 70 | 90 | 60 | — | 55 | 50 |
| Injection P for $CO_2$ [bar] | | | | | | | 50 |
| Station 1 [%] | 100 | 100 | 100 | 100 | 100 | 99 | 99.5 |
| Station 2 [%] | 0 | 0 | 0 | 0 | 0 | 1 | 0.5 |
| T screw 40D (° C.) | 265 | 265 | 260 | 260 | 260 | 260 | 260 |
| Tz0 Hz0 4D (° C.) | 186 | 186 | 185 | 170 | 180 | 180 | 170 |
| Screw Tz1 3D (° C.) | 230 | 230 | 230 | 230 | 230 | 230 | 230 |
| Tz2 5D (° C.) | 250 | 250 | 250 | 250 | 250 | 250 | 250 |
| Tz3 5D (° C.) | 250 | 250 | 250 | 250 | 250 | 250 | 250 |
| Tz4 5D (° C.) | 250 | 250 | 250 | 250 | 250 | 250 | 250 |
| Tz5 5D (° C.) | 230 | 230 | 230 | 220 | 195 | 195 | 195 |
| Tz6 5D (° C.) | 230 | 230 | 230 | 230 | 200 | 200 | 200 |
| Tz7 5D (° C.) | 230 | 230 | 230 | 230 | 200 | 200 | 200 |
| Tz8 5D (° C.) | 240 | 240 | 240 | 240 | 230 | 230 | 230 |
| Pextruder bar | 72 | 48 | 58 | 39 | 50 | 50 | 38 |
| Pdie bar | 56 | 35 | 59 | 30 | 42 | 37 | 24 |
| Tmelt ° C. | 238 | 236 | 242 | 234 | 222 | 219 | 216 |
| Die T at Extruder port heating oil ° C. | 260 | | 240 | 250 | 235 | 235 | 235 |
| Die Lip T ° C. | 260 | | 240 | 250 | 235 | 235 | 235 |
| Density [g/l] | 102 | 530 | 530 | 100 | 80 | 460 | 330 |

TABLE 2

| | Sample No. | | | | | |
|---|---|---|---|---|---|---|
| | 8 | 9 | 10 | 11 | 12 | 13 |
| Blowing Agent | Butane/CO$_2$ | Metoxi-prop | Metoxi-prop | CO$_2$ | CO$_2$ | Pentane/CO$_2$ |
| Nucleation Agent | — | — | — | — | — | — |
| Revolutions [1/min] | 18 | 18 | 18 | 18 | 18 | 15 |
| Voltage [V] | 76 | 77 | 77 | 77 | | 65 |
| Current [amp] | 110 | 99 | 72 | 86 | | 155 |
| Power [kW] | 8 | 7 | 5 | 7 | | 9 |
| Polymer flow rate Kg/h | 45 | 40 | | | 40 | 40 |
| Blowing Agent flow rate Kg/h | 1.2 | 0.8 | 2.4 | 0.8 | — | — |
| CO$_2$ flow rate [g/s] | — | 0.10 | — | — | 0.10 | 0.14 |
| Injection P [bar] | — | — | — | — | — | — |
| Injection CO$_2$ [bar] | 140 | 120 | 50 | 60 | 54 | 90 |
| Station 1 [%] | 100 | 100 | 100 | 100 | 100 | 100 |
| Station 2 [%] | 0 | 0 | 0 | 0 | 0 | 0 |
| T screw 40D (° C.) | 253 | 253 | 253 | 253 | 255 | 255 |
| Tz0 Hz0 4D (° C.) | 186 | 186 | 186 | 186 | 187 | 180 |
| Screw Tz1 3D (° C.) | 230 | 230 | 230 | 230 | 230 | 230 |
| Tz2 5D (° C.) | 250 | 250 | 250 | 250 | 250 | 250 |
| Tz3 5D (° C.) | 250 | 250 | 250 | 250 | 250 | 250 |
| Tz4 5D (° C.) | 250 | 250 | 250 | 250 | 250 | 250 |
| Tz5 5D (° C.) | 230 | 230 | 230 | 230 | 180 | 180 |
| Tz6 5D (° C.) | 230 | 230 | 230 | 230 | 180 | 170 |
| Tz7 5D (° C.) | 230 | 230 | 230 | 230 | 200 | 180 |
| Tz8 5D (° C.) | 230 | 240 | 240 | 240 | 250 | 240 |
| Pextruder bar | 77 | 72 | 10 | 35 | 23 | 30 |
| Pdie bar | 63 | 58 | 5 | 35 | 30 | 37 |
| Tmelt ° C. | 236 | 237 | 238 | 239 | 245 | 238 |
| Die T at Extruder port heating oil ° C. | 250 | 250 | 250 | 250 | 260 | 247 |
| Die Lip T ° C. | 244 | 250 | 250 | 250 | 260 | 247 |
| Density [g/l] | 151 | 518 | — | — | 236 | 235 |

For the tested samples, average density (according to DIN 53420/ISO 845:1998), U-value (DIN EN 12664/12667), light transmission, and cell sizes were determined and are set forth in Table 3. There is a relationship between the parameters but one parameter disturbing the analysis is the skin geometry and, especially for light transmission values. One can see that U-value decreases with sample thickness, when density is not largely varied between the sample thicknesses. As cell sizes of the 11 mm sample and 23 mm do not differ in a major aspect, there is expected to be a linear relationship in U-value depending on sample thickness. The light transmission is however more sensitive for variations in cell sizes. Therefore the 6 mm sample has a more favorable relationship between light transmission and sample thickness than the 11 mm sample. In the case of the 23 mm sample this was proportionally worse than the 11 mm sample, mainly due to uneven skin formations.

TABLE 3

| | Sample | | |
|---|---|---|---|
| | 3 | 8 | 9 |
| Thickness (MM) | 6 | 11 | 23 |
| Density (kg/m$^3$) | 114 | 143 | 127 |
| U-Value (W/m$^2$ · K) | — | 2.59 | 1.45 |
| Light Transmission (Hazegard) (%) | 34.7 | 12.8 | 1.28 |
| Cell Size (mm) | 1.5 | 2.5 | 3 |
| Cell Size Std. Deviation | 0.5 | 2 | 2.5 |
| Blowing Agent | ethanol | butane/CO$_2$ | Butane |

The present foamed polymeric sheet can be envisioned as being employed in any application wherein a polymer sheet is desired. Exemplary applications comprise naturally lit structures (e.g., greenhouses, sun-rooms, pool enclosures, shower enclosures), sunroofs, canopies, shelters, windows, lighting fixtures, sun-tanning beds, stadium roofing, and so forth.

Ranges disclosed herein are inclusive and combinable (e.g., ranges of "up to about 25 wt %, or, more specifically, about 5 wt % to about 20 wt %", is inclusive of the endpoints and all inner values of the ranges of "about 5 wt % to about 25 wt %," etc.). "Combination" is inclusive of blends, mixtures, derivatives, alloys, reaction products, and so forth. Furthermore, the terms "first," "second," and so forth, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A foamed polymer sheet, comprising:
   a polycarbonate sheet having a first side and a second side;
   foam cells located in the polycarbonate sheet, wherein the foam cells have a size distribution, $D_{90}$ of about 0.3 mm to about 2.5 mm;
   a first cap layer disposed on the first side; a second cap layer disposed on the second side; and wherein the first cap layer and/or second cap layer comprise a UV absorber;
   wherein the foamed polymer sheet has a light transmission of greater than or equal to about 5%.

2. The sheet of claim 1, wherein the light transmission is about 30% to about 60%.

3. The sheet according to claim 1, wherein the light transmission is greater than or equal to 10%.

4. The foamed polymer sheet of claim 1, wherein a thickness of the foamed polymer sheet is about 8 mm to about 32 mm.

5. The foamed polymer sheet of claim 4, wherein the thickness is about 10 mm to about 16 mm.

6. An article comprising the foamed polymer sheet of claim 1, wherein the article comprises at least one of naturally lit structures, sunroofs, canopies, shelters, windows, and stadium roofing.

7. The foamed polymer sheet of claim 1, wherein the cells comprise closed cells.

8. The foamed polymer sheet of claim 1, wherein the first cap layer and the second cap layer each comprise a thickness of less than or equal to about 200 micrometers.

9. The foamed polymer sheet of claim 1, wherein the first cap layer and/or the second cap layer are co-extruded with the sheet.

10. The foamed polymer sheet of claim 1, wherein the first cap layer and/or the second cap layer have a thickness of less than or equal to about 200 μm.

11. The foamed polymer sheet of claim 10, wherein the thickness is about 20 μm to about 200 μm.

12. The foamed polymer sheet of claim 11, wherein the thickness is about 30 μm to about 100 μm.

* * * * *